United States Patent [19]

Wlcox

[11] 4,000,926

[45] Jan. 4, 1977

[54] WHEEL WITH INDIVIDUALLY FORMED RIBS

[76] Inventor: Raymond J. Wlcox, 44 Via Casitas, San Luis Rey Downs, Calif. 92068

[22] Filed: Oct. 31, 1975

[21] Appl. No.: 627,580

[52] U.S. Cl. ..................... 301/63 DD; 301/63 PW; 301/64 SH; 29/159.01; 29/460
[51] Int. Cl.² .......................................... B60B 5/02
[58] Field of Search ....... 301/63 R, 63 DD, 63 DT, 301/63 C, 63 PW, 64 SH, 64 R, 64 SD, 37 P, 37 R; 29/159.01, 159.1, 460

[56] References Cited
UNITED STATES PATENTS

| | | | |
|---|---|---|---|
| 1,659,338 | 2/1928 | Turner | 301/63 R |
| 3,790,219 | 2/1974 | Watts | 301/63 DD |

*Primary Examiner*—Robert B. Reeves
*Assistant Examiner*—Charles A. Marmor
*Attorney, Agent, or Firm*—Reising, Ethington, Barnard, Perry and Brooks

[57] ABSTRACT

A vehicle wheel of the disclosure includes a plurality of structural members secured to each other to define a cavity that receives foam which adheres to the structural members to cooperate therewith as a load bearing component. One of the structural members defines the outboard side of a disc of the wheel and includes radial openings that are spaced circumferentially. Stamped ribs project in an outboard direction through the openings and give the wheel a styled appearance. The ribs include flanges engaged with the interior side of the outboard structural member defining the radial openings. A central cap of the wheel includes axially extending notches that receive the radial inner ends of the ribs. The ribs have arcuately curved configurations between their radial inner ends and their radial outer ends. The ribs also have circumferentially extending portions that project in opposite directions at their radial outer ends. Reinforced bolt holes through the disc are provided so as to permit attachment bolts to mount the wheel.

12 Claims, 2 Drawing Figures

4,000,926

WHEEL WITH INDIVIDUALLY FORMED RIBS

BACKGROUND OF THE INVENTION

1. Field of the Invention

This invention relates to vehicle wheels including structural members defining an enclosed cavity that receives foam adhered to the members so as to cooperate therewith as a load bearing component of the wheel.

2. Description of the Prior Art

U.S. Pat. Application Ser. No. 527,555, filed Nov. 27, 1974, discloses and claims a vehicle wheel having an outer skin defined by metallic structural members. The structural members cooperate to define an enclosed volume or cavity for foam. The foam is injected into the cavity and adheres to the structural members so as to cooperate therewith as a load bearing component of the wheel.

The wheel of the above patent application includes an annular outer rim for mounting a tire and a radial disc within the confines of the rim. The disc includes bolt holes for permitting attachment bolts to mount the wheel on a vehicle axle. The outboard side of the disc is defined by a structural member that may include radial ribs giving the wheel a styled appearance, the ribs having a spoke-like appearance. The structural member defining the ribs is formed by a stamping operation. This stamping operation must necessarily incorporate tools that form each of the ribs. Each rib thus necessarily results in a corresponding tooling cost that must be added to the selling price of each wheel.

SUMMARY OF THE INVENTION

A vehicle wheel according to the present invention includes a structural member defining the outboard side of a wheel disc and having radial openings spaced circumferentially from each other. Ribs that are preformed are inserted through the openings projecting in an outboard direction to give the wheel a styled appearance. The ribs cooperate with the outboard structural member defining the openings and other structural members of the wheel to define an enclosed cavity that receives organic resin foam. The foam is adhered to the structural members and to the ribs to cooperate therewith as a load bearing component of the wheel.

The ribs are preferably formed by a stamping operation. The stamping tools for the ribs only have to form a single rib during each stroke. The tooling expense necessary to form the ribs is thus minimized since the tools do not have to incorporate portions for simultaneously forming each rib of the wheel. Also, this rib stamping process may proceed at a much more rapid rate than when the ribs are formed integrally with a structural member that defines the rest of the outboard extremity of the wheel. In fact, the individual rib stamping may proceed so rapidly that the number of ribs necessary, usually five, may be stamped by the required number of strokes in a shorter time than is necessary to stamp a single wheel structural member having the integral ribs. This latter stamping must be formed at a slower rate due to its larger size.

The stamped ribs preferably include flanges that engage the interior side of the outboard structural member defining the radial openings through which the ribs project. These flanges may be adhesively secured to the outboard structural member prior to receiving the foam which is preferably injected into the cavity for curing.

One of the structural members of the wheel comprises a central cap at the outboard side of the wheel adjacent the inner radial ends of the ribs. The cap has axially extending notches that receive the inner ends of the ribs, preferably with flanges of the inner rib ends engaged with the periphery of the notches within the wheel cavity. The notches have closed outboard ends that are of a smaller size than their open inboard ends. The notches taper between their inboard and outboard ends in a rectilinear fashion, as do the inner ends of the ribs. The ribs have arcuately curved configurations between their radial inner ends and their radial outer ends. At their radial outer ends, the ribs have circumferentially extending portions that project in opposite directions.

The rim of the wheel includes an outer annular member having an outboard edge bead receiving the outer peripheral edge of the outboard structural member, and these structural members cooperate in defining an outboard portion of the rim. The wheel also includes an inboard member having an outer peripheral edge received by an inboard edge bead of the outer annular rim member so as to cooperate therewith in defining an inboard portion of the rim. The inboard structural member also defines the inboard extremity of the wheel disc and includes a central portion extending axially in an outboard direction within the cap to cooperate therewith in defining an inner annular portion of the cavity. The inboard and outboard members include undulations at their rim portions so as to strengthen these portions.

The inboard and outboard structural members defining the wheel disc include bolt holes for receiving attachment bolts that mount the wheel. An insert extends between the structural members about the bolt holes to provide a reinforcement to the bolt holes.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
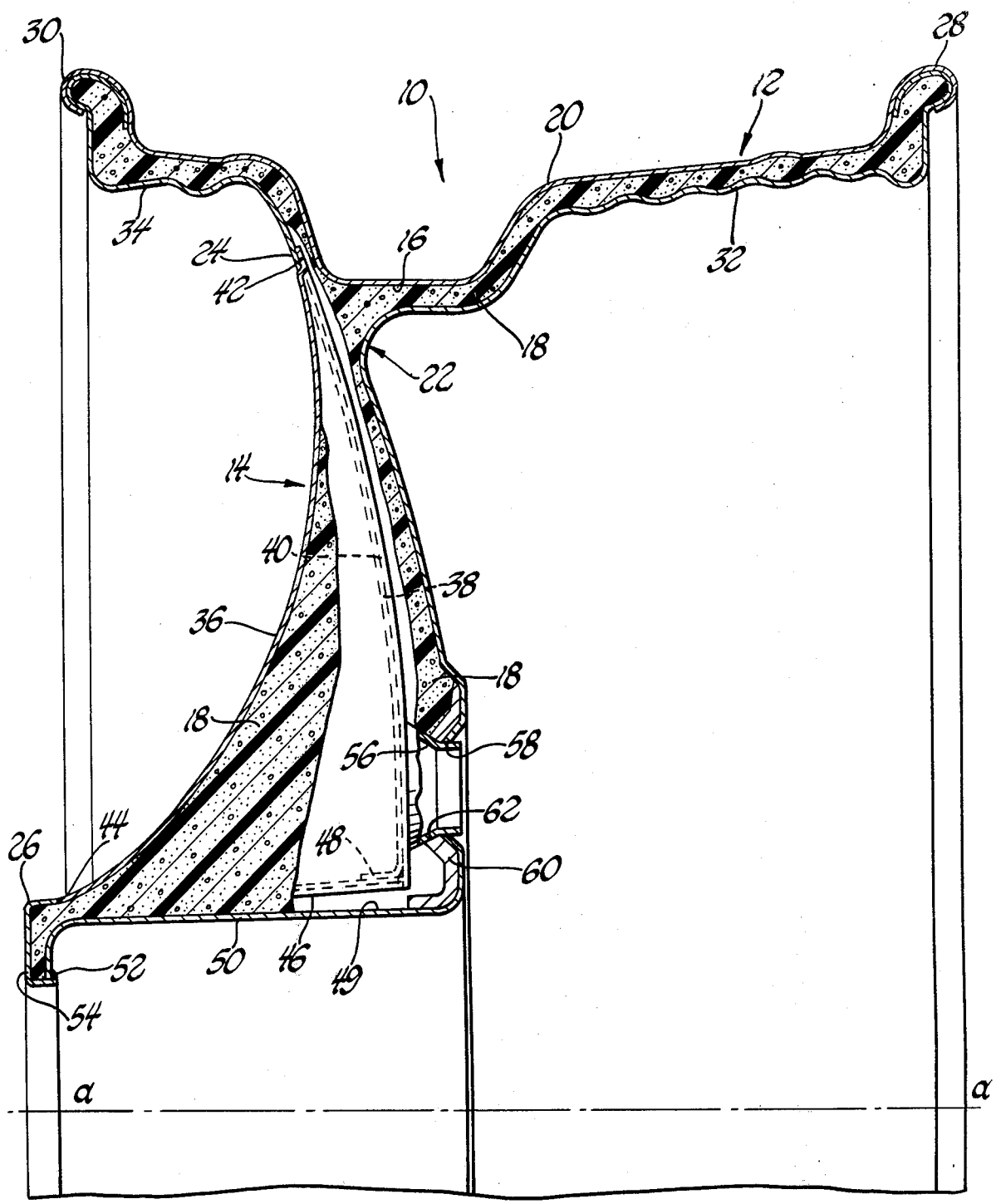
FIG. 1 is a half-sectional view taken through a vehicle wheel embodying the present invention.

Referring to FIG. 1 of the drawings, a vehicle wheel embodying the present invention is generally indicated by reference numeral 10 and is generated about a central axis a—a. The wheel includes an outer rim 12 for mounting a tire and a disc 14 within the confines of the rim.

The wheel 10 includes a plurality of structural members that are secured to each other to define a cavity 16 that receives organic resin foam 18, such as polyurethane foam. The structural members are preferably made from steel of a relatively light gauge, i.e. about 0.015 thickness. The foam is preferably injected into the cavity and adheres to the structural members which define the cavity so as to cooperate therewith as a load bearing component of the wheel. The foam may also be preformed and received within the cavity as the members are secured to each other. A suitable adhesive is then used to adhere the preformed foam to the members.

The structural members of the wheel defining the foam cavity 16 include an outer annular rim member 20, an inboard member 22, an outboard member 24, and a central cap 26. The outer annular rim member 20 includes inboard and outboard edge beads 28 and 30 that respectively receive the outer peripheries of the inboard and outboard members 22 and 24. The inboard member 22 includes an axially extending portion 32 that has an undulating cross-section for strengthening. The undulating portion 32 cooperates with the rim member 20 in defining an inboard portion of the rim. The outboard member 24 includes an axially extending portion 34 that also has an undulating cross-section for strengthening and cooperates with an outboard portion of the rim member 20 to define an outboard portion of the rim.

Figure 2:
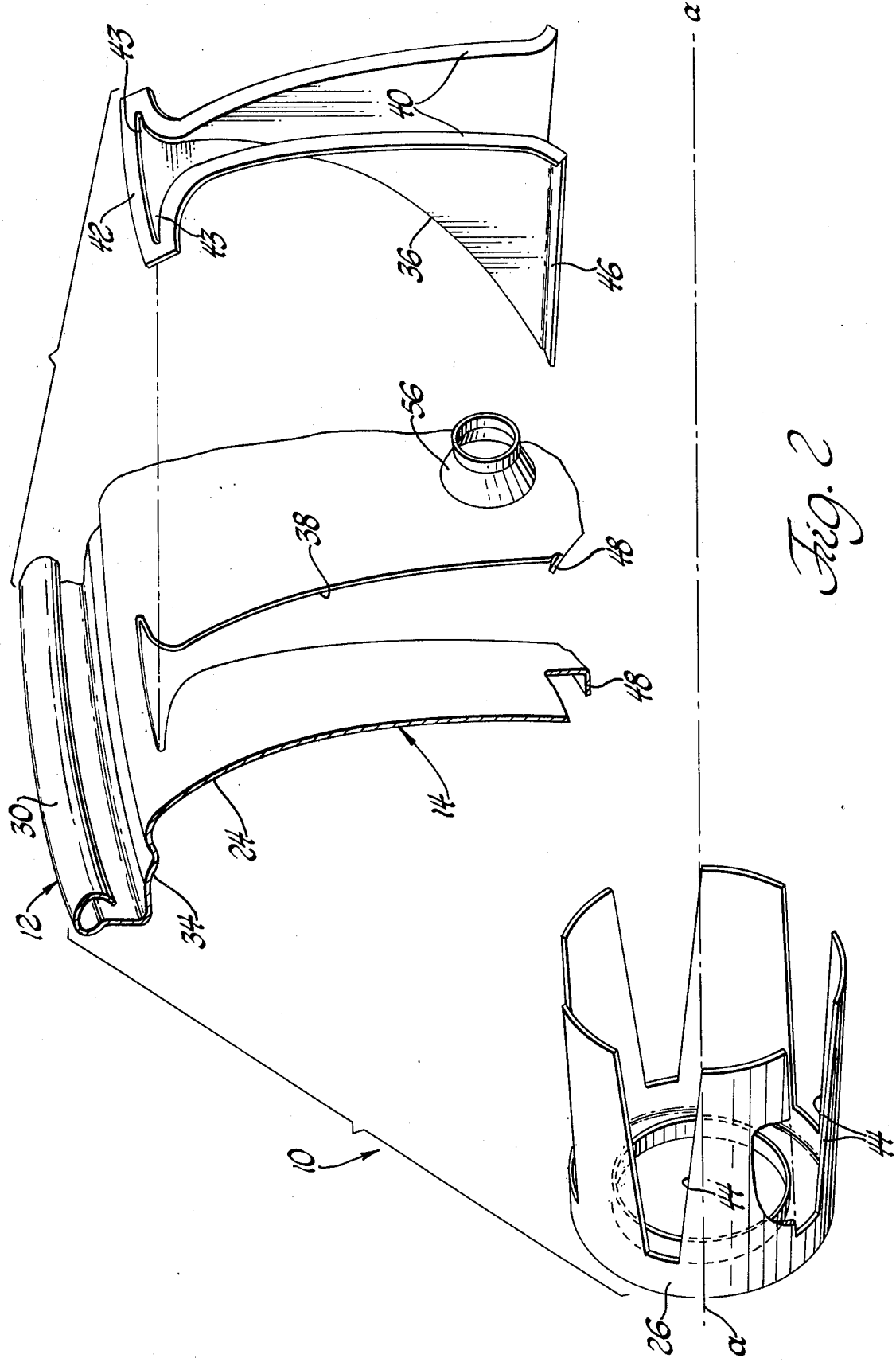
FIG. 2 is an exploded perspective view of portions of the vehicle wheel shown in FIG. 1.

With combined reference to FIGS. 1 and 2, the wheel disc 14 includes a plurality of rims 36, only one being shown, that extend radially and are spaced circumferentially with respect to each other. Each rib 36 is preformed individually, preferably by a stamping operation, and is received by an associated radial opening 38, FIG. 2, in the outboard wheel member 24. The ribs are inserted through the associated openings 38 prior to the securement of the other structural members to each other and project in an outboard direction to give the wheel a styled appearance. The ribs cooperate with the other structural members to enclose the foam cavity 16. The ribs 36 include radially extending flanges 40, as well as a circumferentially extending flange 42, that engage the interior side of the inboard member 24 adjacent the edge thereof defining the associated opening 38. These flanges 40 and 42 may be adhesively bonded to the outboard member 24 to initially position the rib 36 prior to the injection of foam 18 into the cavity 16. The foam adheres to the ribs 36 within the cavity as well as to the structural members so that the ribs cooperate with the structural members and the foam as load bearing components. The circumferentially extending flange 42 of each rib is located at the outer side of portions 43 of the rib, FIG. 2, that project circumferentially in opposite directions.

As best seen in FIG. 2, the central cap 26 of the wheel includes axially extending notches 44 that open in an inboard direction and taper from their smaller closed outboard ends toward their open inboard ends in a rectilinear fashion. The notches 44 receive the radial inner ends of the associated ribs 36 which also taper between smaller outboard ends and larger inboard ends. The radial inner ends of the ribs include flanges 46 that engage the interior side of the cap 26 adjacent the edges thereof defining the notches 44 so as to be secured in position. The inboard end of the cap 26 engages flanges 48 of the outboard structural member 24 so as to be located radially with respect to the wheel. The outboard end of each rib abuts the closed end of the associated cap notch 44 as seen in FIG. 1. Each rib has an arcuately curved configuration between its radial inner end and its radial outer end.

The inboard structural member 22 of the wheel includes a central portion 50, FIG. 1, that extends axially with respect to the wheel in an outboard direction. The central portion 50 has an annular shape generated about axis a—a and cooperates with the cap 26 in defining an inner annular portion 49 of the cavity. The outboard end of this axially extending portion 50 extends in a radial inward direction and is secured by a weld 52 to an inwardly extending radial ring 54 of the cap 26.

The outboard member 24 includes a plurality of funnel shaped projections 56, only one shown, that extend in an inboard direction through holes 58 in the inboard member 22. The projections 56 are located circumferentially intermediate the ribs 36 and provide locations for attachment bolts used to mount the wheel. An annular steel insert 60 extends about the central wheel axis a—a and includes circumferentially spaced apertures 62 through which the projections 56 extend. The insert 60 is engaged with both the inboard and outboard members 22 and 24 adjacent the projections 56 to provide a reinforcement distributing the wheel weight at the bolt attachment locations.

The ribs 36 can be individually formed and secured to the outboard member 24 in a much more economical manner than forming them integrally with this member. Likewise, the central cap 26 is much more economically manufactured as a separate component rather than as an integral portion of the outboard member 24. The assembled wheel is of a relatively light weight as compared to the more conventional forged wheel construction. Also, the wheel has good balance characteristics without the requirement of any machining operation and is relatively inexpensive to manufacture.

While a preferred embodiment of the wheel has been herein described in detail, those skilled in the art will recognize various alternative embodiments and structures for practicing the present invention as defined by the following claims.

What is claimed is:

1. A vehicle wheel comprising: a plurality of structural members secured to each other to define a cavity; said members defining an outer annular rim for mounting a tire and a disc within the confines of the rim; one of the members being an outboard member that defines the outboard side of the disc and includes a plurality of radially extending openings that are spaced circumferentially with respect to each other; a plurality of ribs projecting in an outboard direction through the openings so as to give the wheel a styled appearance and to cooperate with the structural members to enclose the cavity; and foam received within the cavity and adhered to the structural members and to the ribs to cooperate therewith as a load bearing component of the wheel.

2. A wheel according to claim 1 wherein the ribs are stamped and include flanges engaged with the interior side of the outboard structural member adjacent the radial openings thereof.

3. A wheel according to claim 2 wherein the flanges of the ribs are adhesively secured to the outboard structural member.

4. A wheel according to claim 2 wherein one of the structural members comprises a central cap having axially extending notches that receive the radial inner ends of the ribs.

5. A wheel according to claim 4 wherein the radial inner ends of the ribs include flanges engaged with the cap adjacent the notches thereof.

6. A wheel according to claim 5 wherein the notches have closed outboard ends that are of a smaller size than open inboard ends thereof, and the inner end of the ribs also having smaller outboard ends than their inboard ends.

7. A wheel according to claim 4 wherein the ribs have arcuately curved configurations between their radial outer ends and their radial inner ends adjacent the closed outboard ends of the notches.

8. A wheel according to claim 4 wherein the radial outer ends of the ribs have circumferentially extending portions projecting in opposite directions.

9. A wheel according to claim 4 wherein the rim includes an outer annular member having an outboard edge bead receiving the outer peripheral edge of the outboard structural member so as to cooperate therewith in defining an outboard portion of the rim, the wheel also including an inboard structural member that defines the inboard extremity of the cavity at the disc, said inboard member having an outer peripheral edge received by an inboard edge bead of the outer annular rim member so as to cooperate therewith in defining an inboard portion of the rim, and said inboard member also including a central portion extending axially within the cap in an outboard direction to cooperate with the cap in defining an inner annular portion of the cavity.

10. A wheel according to claim 9 wherein the inboard and outboard structural members include bolt holes for receiving attachment bolts for mounting the wheel.

11. A wheel according to claim 10 wherein an insert extends between the inboard and outboard structural members to provide structural strength therebetween.

12. A wheel according to claim 9 wherein the inboard and outboard members include undulations at their rim defining portions.

* * * * *

UNITED STATES PATENT OFFICE
CERTIFICATE OF CORRECTION

Patent No. 4,000,926              Dated January 4, 1977

Inventor(s) Raymond J. Wilcox

It is certified that error appears in the above-identified patent and that said Letters Patent are hereby corrected as shown below:

Change "Wlcox" to --Wilcox-- in both occurences on the Title Page.

*Signed and Sealed this*

*Thirteenth* Day of *December 1977*

[SEAL]

Attest:

RUTH C. MASON
*Attesting Officer*

LUTRELLE F. PARKER
*Acting Commissioner of Patents and Trademarks*